United States Patent
Harris

(10) Patent No.: US 8,402,170 B2
(45) Date of Patent: *Mar. 19, 2013

(54) SERVICING DAEMON FOR LIVE DEBUGGING OF STORAGE SYSTEMS

(75) Inventor: Michael David Harris, Durham, NC (US)

(73) Assignee: Net App, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,297

(22) Filed: Aug. 9, 2011

(65) Prior Publication Data

US 2011/0295821 A1 Dec. 1, 2011

Related U.S. Application Data

(63) Continuation of application No. 11/710,351, filed on Feb. 22, 2007, now Pat. No. 8,015,201.

(51) Int. Cl.
*G06F 9/46* (2006.01)
*G06F 13/00* (2006.01)

(52) U.S. Cl. .................. 709/311; 711/100; 717/124

(58) Field of Classification Search .................. 711/100; 717/124; 719/311
See application file for complete search history.

(56) References Cited

U.S. PATENT DOCUMENTS

| | | | | |
|---|---|---|---|---|
| 6,769,077 B2 * | 7/2004 | Vachon et al. | ................ | 714/43 |
| 7,117,483 B2 * | 10/2006 | Dorr et al. | ................ | 717/124 |
| 7,149,929 B2 * | 12/2006 | Chaurasia | ................ | 714/38.11 |
| 7,434,100 B2 * | 10/2008 | Hogdal et al. | ................ | 714/27 |
| 8,015,201 B1 | 9/2011 | Harris | | |
| 2003/0145230 A1 | 7/2003 | Chiu | | |
| 2005/0097183 A1 | 5/2005 | Westrelin | | |
| 2007/0105607 A1 * | 5/2007 | Russell et al. | ................ | 463/1 |
| 2007/0277009 A1 | 11/2007 | Anschel | | |

OTHER PUBLICATIONS

U.S. Appl. No. 11/731,286, filed Mar. 29, 2007, Harris, Office Action dated Mar. 26, 2012.
U.S. Appl. No. 11/710,351, filed Feb. 22, 2007, Harris.
Office Action issued by the USPTO on Aug. 7, 2012 for U.S. Appl. No. 11/731,286.

* cited by examiner

*Primary Examiner* — Charles E Anya
(74) *Attorney, Agent, or Firm* — Stattler-Suh PC

(57) ABSTRACT

A servicing daemon is described herein for providing servicing of a running computer system (such as a filer). The servicing daemon resides and executes on the operating system of the filer and communicates across a network with a debugger that resides and executes on a remote administering computer. A debugging session is performed that complies with a protocol relating to the remote accessing of files. The debugging session provides live servicing of an application executing on the filer without requiring an actual corefile (having copied filer memory data) to be created. Rather, the servicing daemon creates a simulated corefile header that is sent to the debugger, receives requests from the debugger, and maps addresses specified in the requests to filer memory addresses. The servicing daemon then reads and retrieves data directly from filer memory at the determined filer memory addresses and sends the data to the debugger for analysis.

18 Claims, 9 Drawing Sheets

SERVICING DAEMON FOR LIVE DEBUGGING OF STORAGE SYSTEMS

RELATED APPLICATIONS

This patent application claims benefit to and is a continuation of the United States Patent Application entitled "Servicing Daemon for Live Debugging of Storage Systems," having Ser. No. 11/710,351, filed on Feb. 22, 2007, issued as U.S. Pat. No. 8,015,201.

FIELD OF THE INVENTION

The present invention relates to debugging of storage systems and, more specifically, to a servicing daemon for live debugging of storage systems.

BACKGROUND OF THE INVENTION

A file server is a computer that provides file service relating to the organization of information on storage devices, such as disks. The file server or filer may be embodied as a storage system including a storage operating system that implements a file system to logically organize the information as a hierarchical structure of directories and files on the disks. Each "on-disk" file may be implemented as a set of disk blocks configured to store information, such as text, whereas each directory may be implemented as a specially-formatted file in which information about other files and directories are stored.

As used herein, the term storage operating system generally refers to the computer-executable code operable on a storage system that manages data access and client access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows®, or as a general-purpose operating system with configurable functionality, which is configured for storage applications or debugging/servicing applications as described herein.

A filer's disk storage is typically implemented as one or more storage volumes that comprise physical storage disks, defining an overall logical arrangement of storage space. Available filer implementations can serve a large number of discrete volumes (150 or more, for example). A storage volume is "loaded" in the filer by copying the logical organization of the volume's files, data and directories into the filer's memory. Once a volume has been loaded in memory, the volume may be "mounted" by one or more users, applications, devices, etc. permitted to access its contents and navigate its namespace. As used herein, a volume is said to be "in use" when it is loaded in a filer's memory and at least one user, application, etc. has mounted the volume and modified its contents.

A filer may be configured to operate according to a client/server model of information delivery to thereby allow many clients to access files stored on a server, e.g., the filer. In this model, the client may comprise an application, such as a file-system protocol, executing on a computer that "connects" to the filer over a computer network, such as a point-to-point link, shared local area network (LAN), wide area network (WAN), or virtual private network (VPN) implemented over a public network such as the Internet. Communications between the filer and its clients are typically embodied as packets sent over the computer network. Each client may request the services of the filer by issuing file-system protocol messages formatted in accordance with a conventional file-system protocol, such as the Common Internet File System (CIFS) or Network File System (NFS) protocol.

When the filer runs the storage operating system or other applications, a problem/error in the execution of programming code of the storage operating system or the other applications may occur at any given time. Of particular interest are three types of problem situations that may occur while executing applications on the filer: 1) when an unrecoverable exception occurs causing a "crash" and reboot of the filer, 2) when the performance of the filer is significantly reduced, and 3) when the filer is "wedged" and can not receive and perform administrative commands. In the first situation, an exception in the operating system has occurred that renders the filer inoperative and the filer must be rebooted (the filer restarted and the operating system reloaded). In the second situation, the filer read/write operations for client requests have significantly slowed due to some operating system error (e.g., a memory leak where the filer's memory resources are being allocated but are not being released after usage). In the third situation, the filer is "wedged" when it may or may not be able to perform read/write operations, but can not receive and perform administrative commands (command line instructions), i.e., is apparently unresponsive to all or certain types of commands or operations, in particular administrative commands.

In all three problem situations, a reboot of the filer can be performed. In the first situation, a reboot is automatically performed. In the second and third situations, a manual reboot can be performed (e.g., by issuing an administrative command or pressing the filer's reset button). During the reboot, the filer typically performs a reboot/shut-down procedure that includes a corefile routine that generates a corefile (core dump) that is stored to the filer's memory. The corefile comprises a static image of the memory content/data and state of the filer at the time the corefile routine is performed. The corefile can then be analyzed by a debugging program (debugger) operated by a programmer to determine the problem/error that occurred during the execution of the operating system or other application and to help develop programming code that will avoid the problem/error in the future.

The corefile routine creates a corefile comprising a corefile header and data that is copied from the filer's memory (referred to herein as "filer memory data"). The corefile header comprises corefile metadata (data describing the corefile and the filer) and a set of memory range descriptors that provide an address mapping table between the filer's memory addresses and the corefile addresses. Typically, only particular areas of the filer memory data are copied to the corefile. These areas are generally those areas of filer memory data that are accessible and important for debugging purposes.

Typically, the debugger resides on a client administering computer that is remote from the filer and receives the corefile through a network that connects the administering computer and filer. However, corefiles can be very large in size (due to the copied filer memory data) and require long upload times to the administering computer. As such, a Core Daemon Protocol (CDP) can be used to allow remote analysis of the corefile by the debugger without requiring uploading of the corefile to the administering computer where the debugger resides.

The Core Daemon Protocol is a simple file-access protocol specific for corefiles that allows for the remote reading and retrieving of parts of the corefile. As known in the art, the Core Daemon Protocol specifies a set of rules (e.g., data packet format, sequence of events to occur, etc.) for communication between the administering computer (that runs the debugger) and the filer for remotely accessing the corefile stored on the filer. The Core Daemon Protocol provides simple operations such as Open File Operation (Open("corefile name")), Read L bytes at address/offset A (Read(Offset, Length)), and Close File Operation (Close) to allow remote open, read, and close file operations to a specified file ("corefile name"). The corefile routing typically stores the corefile to a predetermined path/location on the filer (e.g., the filer memory's root directory) with a predetermined filename. The debugger/programmer will have knowledge of the predetermined path/location and filename so the debugger/programmer can locate and access the corefile.

A core daemon (remote core analysis daemon) is a program used to implement the Core Daemon Protocol. The core daemon program works in conjunction with the debugger and accesses the corefile and responds to requests from the debugger in accordance with the Core Daemon Protocol. In particular, the debugger submits requests for data in the corefile to the core daemon program which retrieves the data from the corefile and sends the data to the debugger. As such, the debugger can receive and analyze data of the corefile without requiring uploading of the entire corefile to the remote administering computer. The core daemon program typically resides on a support console computer connected to the filer. The support console typically runs only specialized administrative applications (such as the core daemon program) for administering and servicing the filer. The support console is configured to access the filer's file system and files stored on the filer.

The two above-mentioned methods for debugging the filer's operating system or other applications (i.e., uploading the corefile to the administering computer or performing remote corefile analysis) are considered offline or non-live debugging since the generated corefile is a static image of the filer's memory at a previous time. Another method for debugging the filer is debugging the current condition of the file as it is running (i.e., live debugging). Typically, in live debugging, a "crash" type error has not occurred, but rather, the filer's read/write operations have slowed significantly or the filer has "wedged." In live debugging, a debugger is operated by a programmer on a remote administering computer. The debugger gains control of the filer's operating system and "lock steps" the operations of the filer (i.e., does not allow the filer to perform other operations while waiting for commands from the programmer). The filer is unlocked to perform other operations only when the programmer allows the filer to do so. In this way, while the programmer may be pondering a data result, and does not unlock the filer, the filer can not perform other operations.

The current methods for debugging the filer has several disadvantages. The non-live debugging methods that require a corefile to be generated are disruptive in that they require a reboot procedure that disables all filer processes and shuts down the filer for a particular down-time period (until the filer is restarted and able to again perform operations). In addition, the creation of the corefile can significantly increase the down-time period as the corefile routine copies and stores large amounts of filer memory data to the corefile. Although there are several methods for reducing the size of the corefile, the corefile is still relatively large in size (e.g., typically around 6-12 GB for a 30 GB filer memory). Live debugging is also disruptive in that the operations of the filer are shut down by the debugger while waiting for commands from the programmer. Only when the filer is unlocked by the programmer can the filer perform read/write operations. As such, there is a need for a less-disruptive method for debugging a computer system, such as a filer.

SUMMARY OF THE INVENTION

A computer servicing daemon is described herein for providing live debugging of a running computer system (such as a filer storage system). The servicing daemon resides and executes on the operating system of the filer and communicates across a network with a debugging program (debugger) that resides and executes on an administering computer that is remote from the filer. In some embodiments, the servicing daemon and debugger perform a debugging session that complies with the Core Daemon Protocol. In other embodiments, the servicing daemon and debugger perform a debugging session that complies with any other protocol relating to the remote accessing of files.

The debugging session provides live debugging and maintenance of an operating system or other application executing on the filer without requiring a conventional corefile (comprising a corefile header and copied filer memory data) to be created. Rather, the servicing daemon creates a simulated corefile comprising only a simulated corefile header without copied filer memory data. To distinguish a simulated corefile from a conventional corefile, the latter is sometimes referred to herein as an actual or real corefile. The simulated corefile header is sent to the debugger which uses the simulated corefile header to make requests for particular data, the requests specifying a particular corefile address from which the data is to be read. The servicing daemon receives the requests from the debugger and maps the corefile addresses specified in the requests to filer memory addresses. The servicing daemon then reads and retrieves data directly from filer memory at the determined filer memory addresses (rather than reading and retrieving the corresponding filer memory data copied to a corefile at the specified corefile addresses). As such, the servicing daemon provides to the debugger what appears to be a conventional corefile debugging session that complies with the Core Daemon Protocol, but without requiring creation of a real corefile.

In one implementation, the servicing daemon has a plurality of programming components/layers including a memory virtualization component, a listener component, a remote procedure call (RPC) component, and a reverse-address mapping component. Prior to or upon initiation of a debugging session, the memory virtualization component creates a simulated corefile (comprising a simulated corefile header). The listener component listens for and receives data packets in the CDP format from the debugger on a dedicated port of the filer. Upon receiving an initial connection request from the debugger, the listener component establishes a debugging session with the debugger and hands the debugging session to the RPC component.

The RPC and reverse-address mapping components are used thereafter to receive and respond to requests from the debugger (e.g., open file, read file, close file). If a request for the corefile header is received, the simulated corefile header is sent to the debugger. The simulated corefile header includes a set of memory range descriptors that provides an address mapping table between filer memory addresses and corefile addresses. The debugger uses the simulated corefile header to make requests for data at particular corefile addresses. When a request for data is received from the debugger, the reverse-address mapping component is used to map the corefile addresses of the requests to filer memory addresses. The data at the determined filer memory addresses are then read and retrieved directly from the filer memory and sent to the debugger. The requested data are then used by the debugger and programmer to debug the operating system and/or other applications running on the filer.

Use of the servicing daemon for debugging of the filer provides numerous advantages. It provides debugging of the filer without the disruption caused by creating a real corefile (i.e., does not require the copying and storing of large amounts of filer memory data to the corefile). It also does not require the occurrence of problem situations that cause the real corefile to be created in the first place (e.g., the occurrence of a "crash," significant slow-down of the filer, or the filer becoming "wedged"). Although the servicing daemon may be used for debugging of the filer in some of these problem situations (e.g., significant slow-down of the filer or the filer becoming "wedged"), a problem situation is not required and the servicing daemon may be used for maintenance debugging of the filer to avoid such problem situations or for optimizing the programming code running on the filer. Also, the servicing daemon may reside and execute on the operating system of the filer. As such, a separate support console computer (that executes specialized administrative applications) connected to the filer is no longer required.

In addition, the servicing daemon provides live debugging of a running filer without requiring lock-stepping of the filer operations that may stop the filer's execution of other operations during the debugging session. Rather, the servicing daemon implements programming components that perform simple operations similar to any of the other operations routinely performed by the filer. As such, use of the servicing daemon in a debugging session does not interfere with the filer's execution of other operations.

Further, the servicing daemon integrates with established corefile protocols and debugging programs that do not need to be modified to work with the servicing daemon. The servicing daemon provides to a conventional debugger a virtual corefile debugging session that appears to be a conventional corefile debugging session that complies with the Core Daemon Protocol. As such, a conventional debugging program can be used with the servicing daemon and operates as if performing a conventional debugging session on a real corefile.

BRIEF DESCRIPTION OF THE DRAWINGS

The novel features are set forth in the appended claims. However, for purpose of explanation, several embodiments of the invention are set forth in the following figures.

DETAILED DESCRIPTION

The disclosure of United States Patent Application entitled "Servicing Daemon for Live Debugging of Storage Systems," having Ser. No. 11/710,351, filed on Feb. 22, 2007, issued as U.S. Pat. No. 8,015,201, is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections. Section I describes a storage system environment in which some embodiments operate. Section II describes an operating system and memory of a filer in which some embodiments operate. Section III describes components of a servicing daemon and debugger that interact to perform a debugging session on a filer. Section IV describes methods for performing debugging of a filer.

I. Storage System Environment

Figure 1:
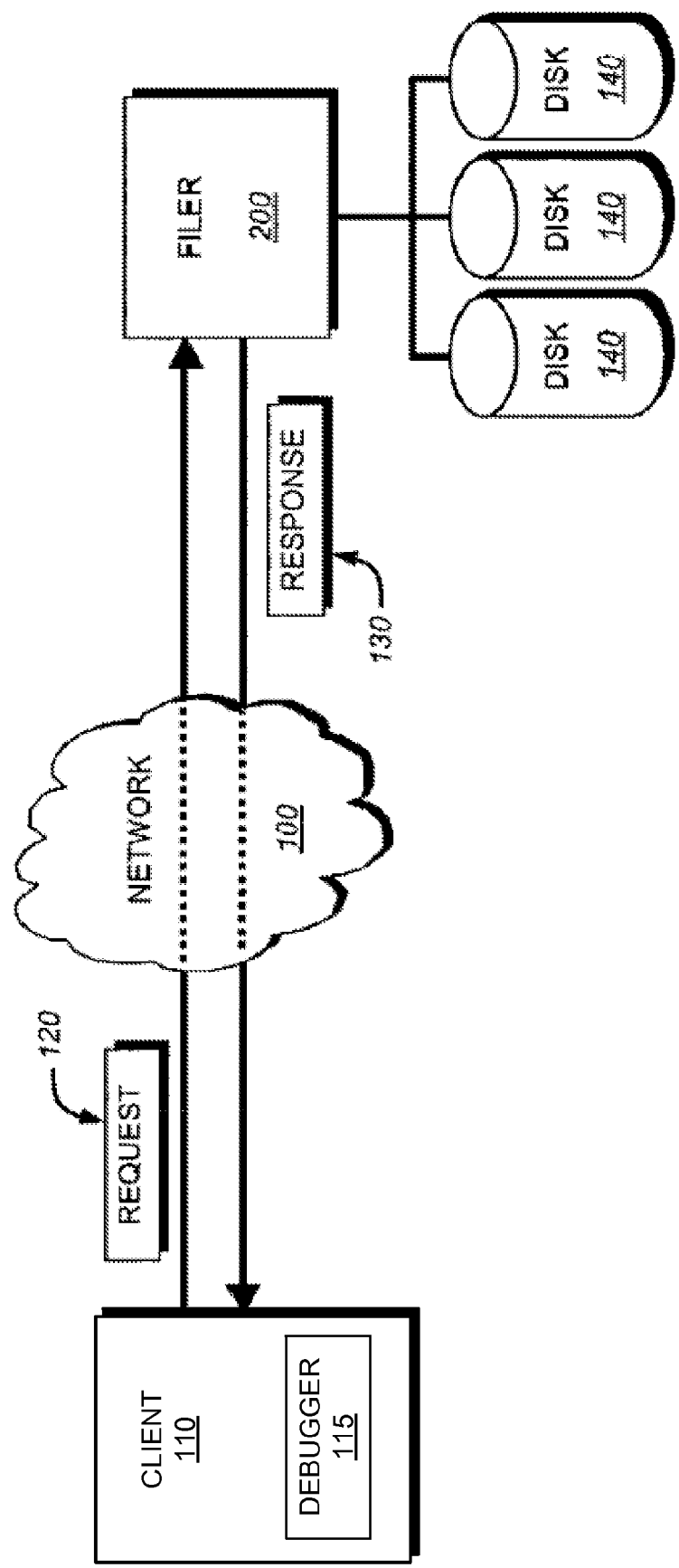
FIG. 1 is a schematic block diagram of an exemplary storage system environment in which some embodiments operate.

FIG. 1 is a schematic block diagram of a storage system environment that includes a network 100 through which a client 110 may communicate with a server, e.g., a file server 200. The network may comprise one or more point-to-point links, shared local area networks (LAN), wide area networks (WAN), and the like. The filer server or "filer" 200 is a computer that provides file service relating to the organization of information on a set of one or more storage devices, such as storage disks 140. For purposes of the following discussion, the "client" refers to a remote server or computer that makes a request to the filer and the "filer" refers to a local server or computer that performs the request.

In operation, the client 110 may send the filer 200 a request 120 to access a specific file or directory (e.g., stored in the disks 140). Examples of requests include open, read, write, or close file requests. The request may be "packetized" and formatted according to predetermined communication protocols (e.g., Transport Control Protocol (TCP), Internet Protocol (IP), Core Daemon Protocol (CDP), etc.). The filer receives and processes the client request 120 and transmits a response 130 to the client over the network 100. Communication between the client 110 and filer 200 may be file or block based where the filer 200 receives and responds to file or block based requests. Moreover, the client 110 may interact with the filer 200 in accordance with a client/server model of information delivery. That is, the client may forward requests 120 for the services of the filer, and the filer may return the results 130 of the services requested by the client, by exchanging packets encapsulating, e.g., the Common Internet File System (CIFS) protocol or Network File System (NFS) protocol format over the network 100.

The client 110 may be a general-purpose computer configured to execute applications. In some embodiments, the client 110 is an administering computer that executes a debugging program (debugger) 115 for servicing the filer 200. The debugger is an administering program that helps a programmer service the filer 200 during an administering session (debugging session). The debugger and debugging session may be implemented for various reasons, for example, to test, debug (correct errors in), or optimize programming code of an application executing on the filer 200 (such as the filer's operating system). As referred to herein, however, the debugger and debugging session are implemented to help analyze data and programming code of one or more applications executing on the filer 200, regardless of any specific purpose of doing so.

Various debuggers are well known in the art. In some embodiments, the debugger 115 is configured to analyze a corefile stored on the filer 200 in accordance with the Core Daemon Protocol or any other protocol relating to the remote accessing of files. A debugging session is driven by the programmer who interacts with the debugger (e.g., through a graphical user or command line interface of the debugger) to request particular data from the debugger which submits the request to the filer. As used herein, the terms "programmer" and "debugger" generally refer to the source of a request made upon the filer and are sometimes used interchangeably.

Figure 2:
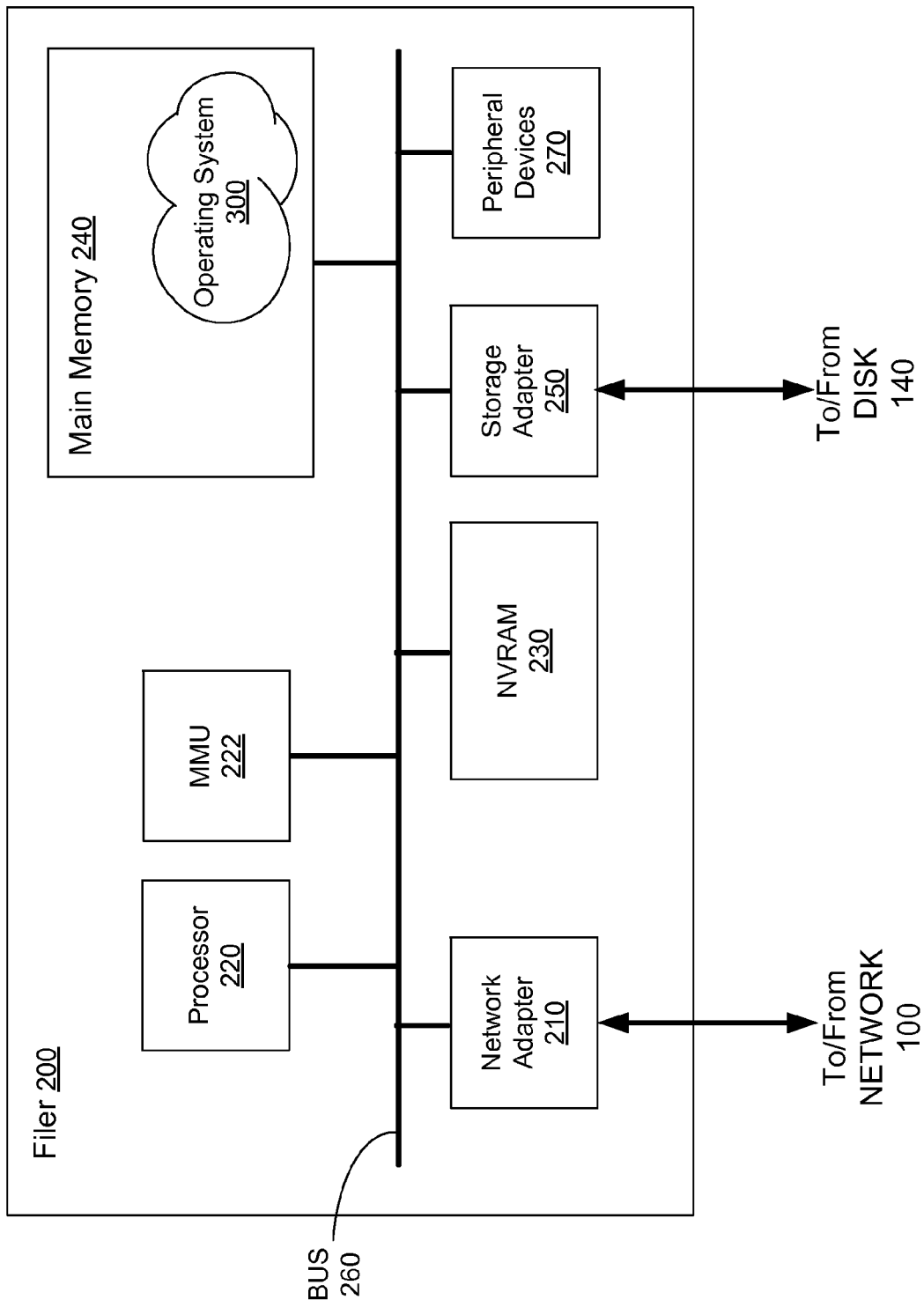
FIG. 2 is a schematic block diagram of an exemplary filer that may be employed in the storage system environment of FIG. 1.

FIG. 2 is a schematic block diagram of an exemplary filer 200 that may be employed in the storage system environment of FIG. 1. The filer 200 comprises a network adapter 210, processor 220, a memory management unit (MMU) 222, a non-volatile random access memory (NVRAM) 230, a main memory 240, a storage adapter 250, and various peripheral devices 270 interconnected by a system bus 260. Those skilled in the art will understand that the embodiments described herein may apply to any type of special-purpose computer (e.g., file serving appliance) or general-purpose computer, including a standalone computer, embodied or not embodied as a storage system. To that end, filer 200 can be broadly, and alternatively, referred to as a storage system or a computer system. Moreover, the teachings of the embodiments described herein can be adapted to a variety of storage system architectures including, but not limited to, a network-attached storage environment, a storage area network and disk assembly directly-attached to a client/host computer. The term "storage system" should, therefore, be taken broadly to include such arrangements.

The network adapter 210 comprises the mechanical, electrical and signaling circuitry needed to connect the filer 200 to a client 110 over a computer network 100. The filer may include one or more network adapters. Each network adapter 210 has a unique IP address and may provide one or more data access ports for clients 110 to access the filer 200 (where the network adapter accepts client requests in the form of data packets). Each data access port has a unique port number and is typically assigned to receive data packets having a particular protocol format (e.g., port 80 is typically dedicated for packets in the HTTP format). In some embodiments, a separate dedicated port (having a unique port number) is used only for CDP communications (CDP formatted data packets) between a client 110 and the filer 200 to avoid port usage conflicts. In these embodiments, a listener component/thread waits and "listens" on the dedicated port for CDP packets to establish a private debugging session between a client and the filer.

The filer 200 may include a NVRAM 230 that may be employed in a filer's architecture as a backup memory that ensures the filer does not "lose" received client information, e.g., CIFS and NFS requests, in the event of a system shutdown or other unforeseen problem. The NVRAM is typically a large-volume solid-state memory array (RAM) having either a back-up battery, or other built-in last-state-retention capabilities (e.g. a FLASH memory), that holds the last state of the memory in the event of any power loss to the array. Therefore, even if a client request stored in the filer's main memory is lost or erased, e.g., due to a temporary power outage, it still may be recovered from the filer's NVRAM.

The main memory 240 comprises storage locations that are addressable by the processor and adapters for storing software program code and data. The memory typically comprises a form of random access memory (RAM) that is generally cleared by a power cycle or other reboot operation (e.g., it is a "volatile" memory). The processor 220 and adapters may, in turn, comprise processing elements and/or logic circuitry configured to execute the software code and manipulate the data stored in the main memory 240.

The processor 220 executes an operating system 300 application of the filer 200 that functionally organizes the filer by, inter alia, invoking storage operations in support of a file service implemented by the filer. In some embodiments, the operating system 300 includes a servicing daemon program that is also executed by the processor 220. Portions of the operating system 300 are typically resident in main memory 240. It will be apparent to those skilled in the art, however, that other processing and memory means, including various computer readable media, may be used for storing and executing program instructions pertaining to the operating system and servicing daemon program.

The storage adapter 250 cooperates with the operating system 300 executing on the filer to access information requested by the client. The information may be stored on the disks 140 that are attached, via the storage adapter 250, to the filer 200 or other node of a storage system as defined herein. The storage adapter 250 includes input/output (I/O) interface circuitry that couples to the disks 140 over an I/O interconnect arrangement, such as a conventional high-performance, Fibre Channel serial link topology. The information is retrieved by the storage adapter and, if necessary, processed by the processor 220 (or the adapter 250 itself) prior to being forwarded over the system bus 260 to the network adapter 210, where the information is formatted into a packet and returned to the client 110.

In an illustrative embodiment, the disks 140 are arranged into a plurality of volumes, each having a file system associated therewith. The volumes each include one or more disks. In one embodiment, the physical disks 140 are configured into RAID groups so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. In a typical implementation, a volume is embodied as a multiplicity of RAID groups.

The various peripheral devices 270 comprise one or more peripheral devices that are connected to the bus 260 and accessible by the processor 220. Examples of a peripheral device 270 include sound cards, video cards, various Peripheral Component Interconnect (PCI) standard devices, and so forth. The memory management unit (MMU) 222 handles the memory accesses requested by the processor 220 and maps a physical address space that is accessible by the processor 220. As known in the art, the processor 220 may access storage locations in a variety of memory components connected to the system bus 260, such as physical memory units (e.g., main memory 240, NVRAM 230) and devices having memory (e.g., network adapter 210, storage adapter 250, or the various peripheral devices 270). The MMU 222 maps all storage locations in the variety of memory components to a single collective physical address space that is accessible by the processor 220. The storage locations in the physical address space corresponding to devices having memory (e.g., network adapter 210, storage adapter 250, or the various peripheral devices 270) is sometimes referred to as "device mapped memory" in the physical address space. The processor 220 may read and write to any storage location in the physical address space in a similar manner, regardless of which memory component the storage location actually (physically) resides.

Figure 4:
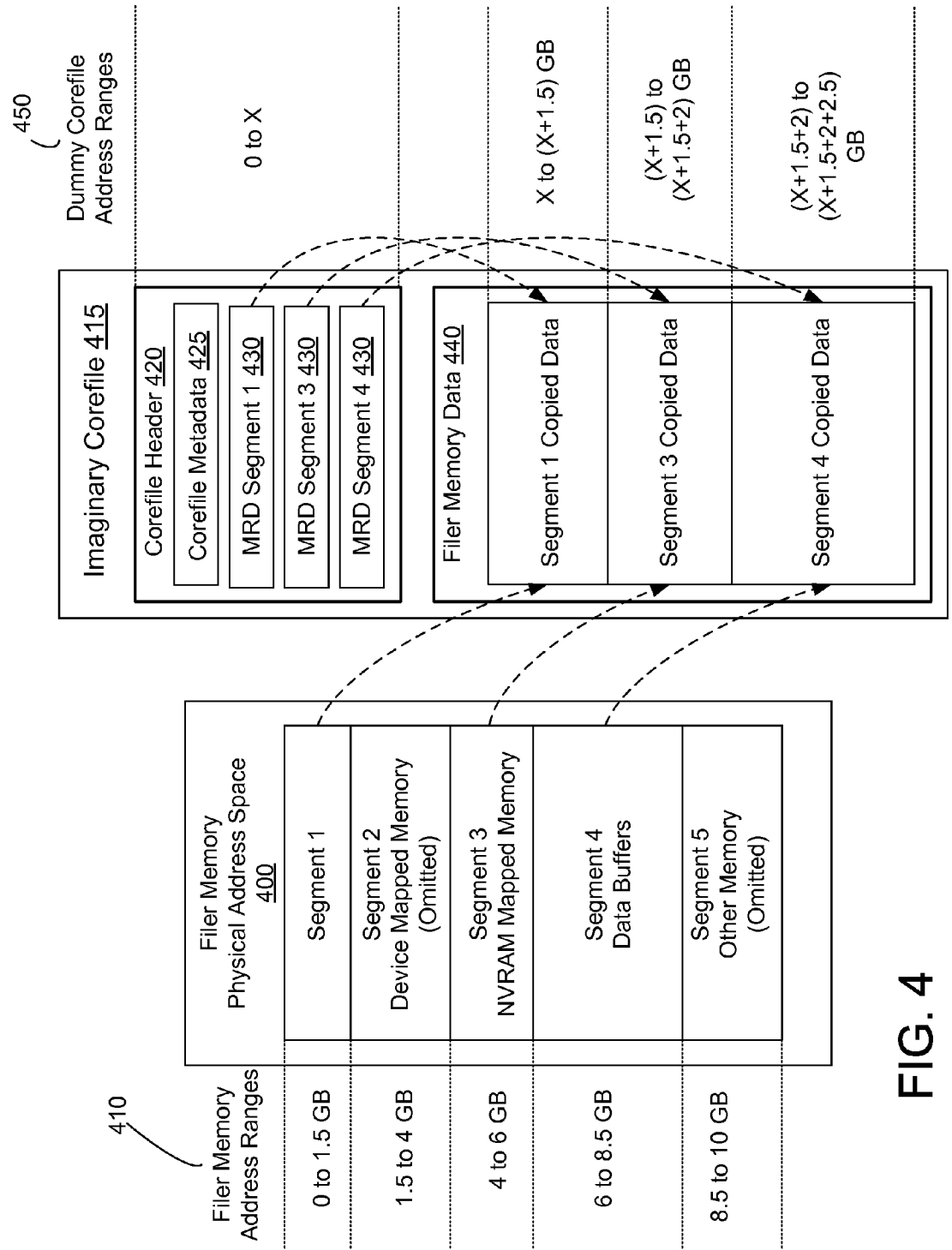
FIG. 4 shows a conceptual diagram of an exemplary filer memory and an imaginary corefile that represents the filer memory.

The collective physical address space of the filer is referred to herein as the "filer memory" or "local memory." FIG. 4 shows a conceptual diagram of an exemplary filer memory 400 of a filer. As shown in FIG. 4, the filer memory 400 is divided into a plurality of memory segments (e.g., 1 through 5). Each memory segment comprises a related contiguous memory area (such as a memory segment/area for the NVRAM mapped memory or the device mapped memory). Each filer memory segment has a unique filer memory address/offset range (local memory address range) 410 determined by the MMU 222. For example, the NVRAM mapped memory segment (Segment 3) may have an associated filer memory address range of 4-6 GB.

II. Storage Operating System and Filer Memory

The organization of a storage operating system for the exemplary filer is now described briefly. However, it is expressly contemplated that the principles of the embodiments described herein can be implemented using a variety of alternative storage operating system architectures. As discussed above, the term "storage operating system" as used herein with respect to a filer generally refers to the computer-executable code operable on a storage system that implements file system semantics (such as the above-referenced WAFL™) and manages data access. In this sense, Data ONTAP™ software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
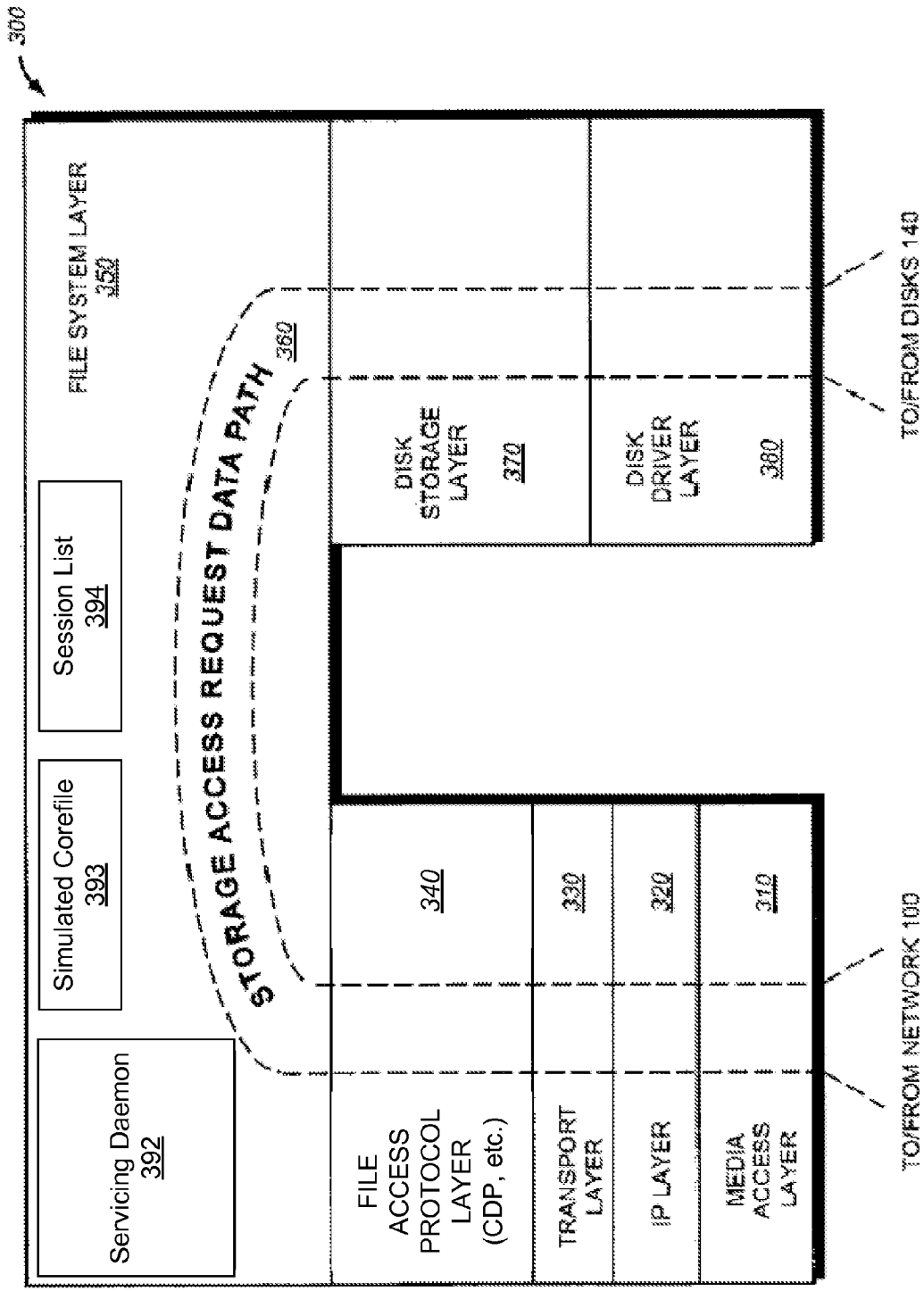
FIG. 3 is a schematic block diagram of an exemplary storage operating system that may be implemented by the filer in FIG. 2.

As shown in FIG. 3, the operating system 300 comprises a series of software layers that form an integrated network protocol stack. The protocol stack provides data paths 360 for clients to access information stored on the filer using file-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for clients 110 to access the filer 200. In some embodiments, the IP layer 320 layer provides a dedicated private port for Core Daemon Protocol communications between a client 110 and the filer 200.

A file-access protocol layer 340 provides multi-protocol data access and, for example, may include support for the Hypertext Transfer Protocol (HTTP) protocol, the NFS protocol, and the CIFS protocol. The operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. In addition, the operating system 300 includes support for the Core Daemon Protocol or any other protocol relating to the remote accessing of files. The operating system 300 also includes a disk storage layer 370 that implements a disk storage protocol, such as a RAID protocol and a disk driver layer 380 that implements a disk control protocol, such as the small computer system interface (SCSI).

Bridging the disk software layers with the network and file-system protocol layers is a file system layer 350 of the operating system 300. In an illustrative embodiment, the layer 350 implements a file system having an on-disk format representation that is block-based using, e.g., 4-kilobyte (KB) data blocks and using inodes to describe the files. An inode is a data structure used to store information about a file, such as ownership of the file, access permission for the file, size of the file, name of the file, location of the file, etc. In response to receiving a client's file access request 120, the file system generates operations to load (retrieve) the requested data from disks 140 if it is not resident in the filer's memory. An external file handle in the client request typically identifies a file or directory requested by the client 110. Specifically, the file handle may specify a generation number, inode number and volume number corresponding to the client's requested data.

If the information is not resident in the filer's memory, the file system layer 350 indexes into an inode file using the received inode number to access an appropriate entry and retrieve a logical volume block number. The file system layer 350 then passes the logical volume block number to the disk storage (RAID) layer 370, which maps that logical number to a disk block number and sends the latter to an appropriate driver (for example, an encapsulation of SCSI implemented on a fibre channel disk interconnection) of the disk driver layer 380. The disk driver accesses the disk block number from disks 140 and loads the requested data in memory 240 for processing by the filer 200. Upon completion of the request, the filer (and storage operating system) returns a response 130, e.g., a conventional acknowledgement packet defined by the CIFS specification, to the client 110 over the network 100.

It should be noted that the software "path" 360 through the storage operating system layers described above needed to perform data storage access for the client request received at the filer may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by filer 200 in response to a file system request packet 120 issued by client 110. Moreover, in a further embodiment, the processing elements of network and storage adapters 210 and 250 may be configured to offload some or all of the packet processing and storage access operations, respectively, from processor 220 to thereby increase the performance of the file service provided by the filer.

Included within the file system layer 350 is a servicing daemon 392 that communicates with a debugging program (executing on a remote client computer) to debug and service the filer. The servicing daemon 392 creates a simulated core-file 393 (comprising a simulated corefile header) that is stored at the filer (e.g., in the filer's main memory 240). The simulated corefile header is sent to the debugging program which uses the simulated corefile header to make requests for data during a debugging session. In some embodiments, a session list 394 of debugging sessions between the servicing daemon 392 and the debugging program is also created and stored at the filer (e.g., in the filer's main memory 240). The session list 394 may contain various information regarding one or more debugging sessions, such as date and time of the session, requests made during the session, results of the session, filename, file path, indicator for simulated corefile or real corefile, etc.

III. Servicing Daemon and Debugger Components/Layers

Figure 5:
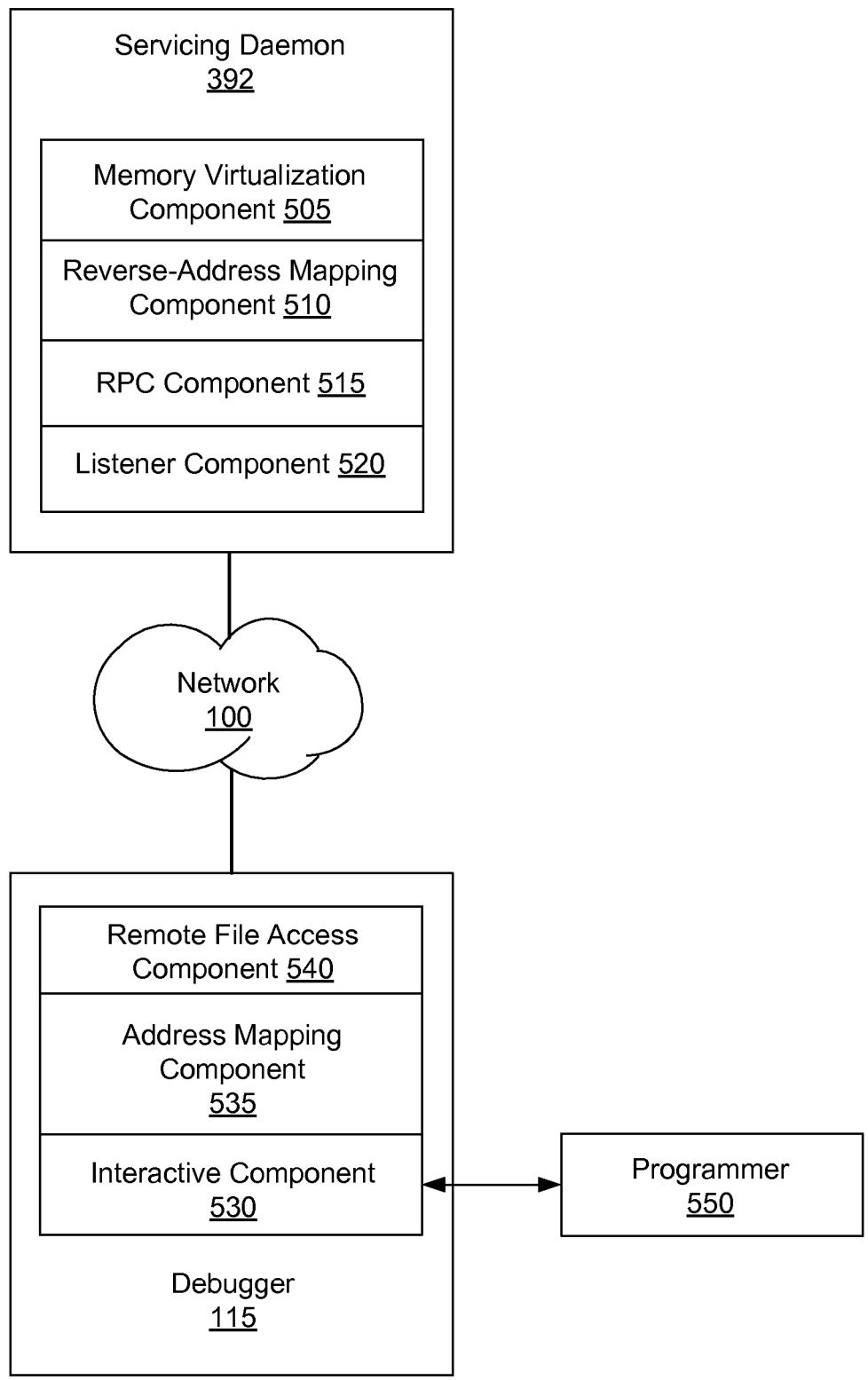
FIG. 5 shows a conceptual diagram of various software components of a servicing daemon and an exemplary debugger.

FIG. 5 shows a conceptual diagram of various software components/layers of the servicing daemon 392 and an exemplary debugger 115. The servicing daemon 392 (residing and executing on the operating system of the filer) and debugger 115 (residing and executing on a remote client administering computer) communicate across a network 100 during a debugging session. In some embodiments, the servicing daemon 392 and debugger 115 work in conjunction to provide live debugging and servicing of the current state of the filer as it is running (i.e., performing other operations). Rather than producing a conventional corefile, the servicing daemon 392 produces a simulated corefile and responds to data requests from the debugger 115 by accessing data directly from filer memory. From the debugger's view, however, a conventional debugging session is occurring with the servicing daemon 392.

A. Creating a Simulated Corefile

The servicing daemon 392 comprises a memory virtualization component 505, a reverse-address mapping component 510, a remote procedure call (RPC) component 515, and a listener component 520. Prior to or upon initiation of a debugging session with the debugger 115, the memory virtualization component 505 analyzes the structure and content of the filer memory and creates a simulated corefile comprising a virtualization/representation of the filer memory. This is considered a "simulated" corefile since an actual/real corefile having large amounts of copied filer memory data is not created here. However, the simulated corefile contains metadata and memory range descriptors (discussed below) that relate to a possible real corefile that would have been created to represent a filer memory by a conventional corefile routine had the conventional corefile routine been invoked to do so. The possible real corefile for the filer memory is referred to herein as the imaginary corefile. As such, the metadata and memory range descriptors of the simulated corefile comprise metadata and memory range descriptors that would be created for the imaginary corefile.

FIG. 4 shows an example of an imaginary corefile 415 for a filer memory 400 that would be produced by a conventional corefile routine (had the conventional corefile routine been invoked to do so). The corefile routine may produce the imaginary corefile 415 by inspecting and analyzing the filer memory (physical address space of the filer) to determine memory segments (related contiguous memory areas) and a filer memory address range for each memory segment. The imaginary corefile 415 comprises a corefile header section 420 and a filer memory data section 440. The filer memory data section 440 comprises copied data from one or more filer memory segments.

Within the imaginary corefile 415, the corefile header section 420 and copied filer memory segments of the filer memory data section 440 have associated corefile address/offset ranges comprising beginning and ending corefile addresses. The corefile addresses of the imaginary corefile 415 may be considered dummy or fictional addresses as the imaginary corefile 415 is not actually created. Also, a corefile address/offset indicates an address relative to the imaginary corefile 415 itself, where corefile address/offset 0 indicates the location of the beginning (first data) of the imaginary corefile 415. For example, the corefile header section 420 is located at corefile address range 0 (starting address) to X (ending address), where X is determined by the particular corefile format/layout specified for the particular filer platform type (processor type and model). For example, for a particular corefile format type, the corefile header may be required to be 4 KB in length at corefile address/offset 0, so that the corefile header address range is 0 to 4 KB. As such, the format of a corefile may vary depending on filer platform type. However, the debugger will typically have knowledge of and be configured to operate with a particular corefile format so it will be able to interpret the corefile properly.

The corefile address range of the first copied filer memory segment of the filer memory data section 440 then starts from the ending corefile address (X) of the corefile header 420. The ending corefile address for the first copied filer memory segment is determined by adding the size of the first copied filer memory segment to the starting corefile address of the first copied filer memory segment. For example, as shown in FIG. 4, the corefile address range of Segment 1 Copied Data (the first copied filer memory segment) is from X to (X+1.5)GB, where 1.5 GB is the size of Segment 1 Copied Data (which corresponds to the size of Memory Segment 1 in the filer memory 400). The corefile address range of the second copied filer memory segment then starts from the ending corefile address of the first copied filer memory segment, where the ending corefile address of the second copied filer memory segment is determined by adding the size of the second copied filer memory segment to the starting corefile address of the second copied filer memory segment, and so forth. For example, as shown in FIG. 4, the corefile address range of Segment 3 Copied Data (the second copied filer memory segment) is from (X+1.5) to (X+1.5+2)GB, where 2 GB is the size of Segment 3 Copied Data (which corresponds to the size of Memory Segment 3 in the filer memory 400).

The corefile header 420 comprises corefile metadata 425 and a set of one or more memory range descriptors 430. The corefile metadata 425 comprises metadata that describes the imaginary corefile 415 and the filer (the memory of which the imaginary corefile 415 represents). The corefile metadata 425 may include such information as an identification of the imaginary corefile as a corefile type, size of the imaginary corefile as it would be if created, the platform (processor) type and model of the filer, the size of the filer memory that is represented, etc. In some embodiments, the corefile metadata 425 may include a format version type of the corefile structure for allowing recognition of a format to provide forward and backward compatibility.

Each memory range descriptor (MRD) 430 in the set of memory range descriptors is associated with a particular segment in filer memory that would have been copied to the filer memory data section 440. For example, "MRD Segment 1" is associated with "Segment 1" in the filer memory at filer memory address range 0 to 1.5 GB. A memory range descriptor 430 for a filer memory segment comprises a filer memory address range for the filer memory segment and a corresponding corefile address range indicating the address in the imaginary corefile 415 where the copied data of the filer memory segment would be located. The corresponding corefile address range for a particular filer memory segment is dependent on the size of the corefile header (as specified for the particular corefile format), the size of the filer memory segment, and the size of any filer memory segments located before it in the filer memory (i.e., any filer memory segments having a lower filer memory address). Note that the corefile address ranges contained in the memory range descriptors 430 comprise dummy or fictional address ranges since the imaginary corefile is not actually created.

Figure 6:
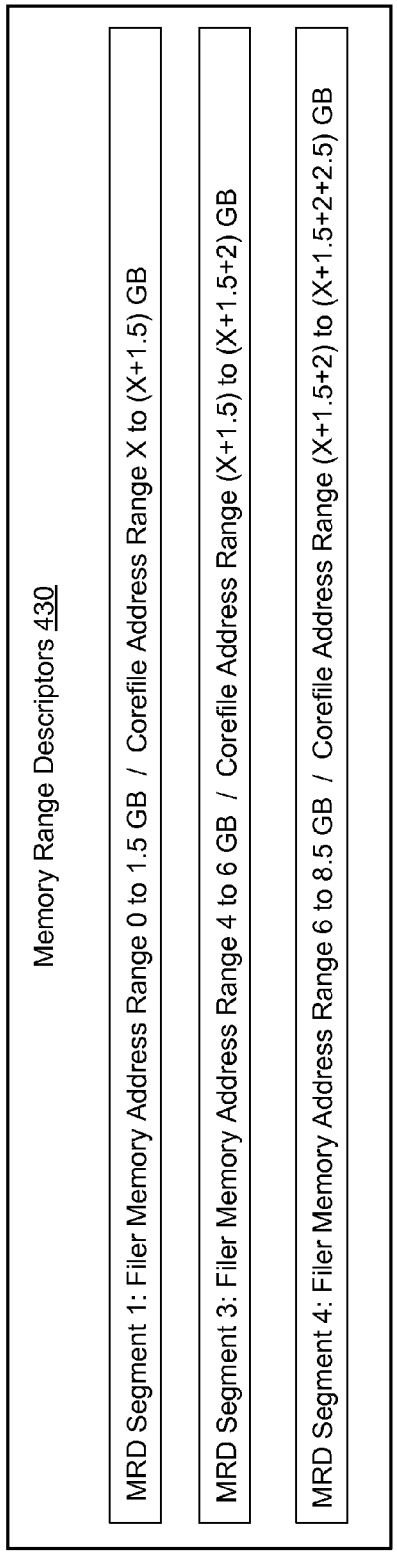
FIG. 6 illustrates exemplary memory range descriptors contained in the imaginary corefile of FIG. 4.

FIG. 6 illustrates exemplary memory range descriptors (MRD) 430 of the imaginary corefile 415 of FIG. 4. As shown in the example of FIG. 6, the memory range descriptor 430 associated with Segment 3 of the filer memory 400 indicates that Segment 3 is located at the filer memory address range 4 to 6 GB and is copied to the imaginary corefile 415 at the dummy corefile address range (X+1.5) to (X+1.5+2) GB. Collectively, the set of memory range descriptors 430 provides an address mapping table between the filer memory address ranges and dummy corefile address ranges for any filer memory segments that would be copied to the filer memory data section 440 of the imaginary corefile 415. The debugger uses the set of memory range descriptors 430 to make requests for particular data to the servicing daemon.

B. Reducing the Size of a Corefile Note that Segment 2 and Segment 5 in the filer memory 400 were not copied to the filer memory data section 440 of the imaginary corefile 415 and do not have associated memory range descriptors 430 in the corefile header 420. Typically, only particular portions of the data stored in the filer's memory is copied to the corefile. Generally, a conventional corefile routine copies to the corefile those areas of filer memory that are accessible and important for debugging purposes. Filer memory data may be inaccessible due to security concerns, such as data containing personal information comprising passwords, account numbers, etc. that are not copied to the corefile. Filer memory data may also be inaccessible when accessing the data causes undesirable side effects.

Segments of the filer memory that are inaccessible or not important for debugging purposes may not be copied to (omitted from) the corefile to reduce the size of the corefile. These omitted segments are also not listed in the memory range descriptors of the corefile header (i.e., do not have an associated memory range descriptor in the corefile header). For example, as shown in FIG. 4, device mapped memory (Segment 2) is typically omitted and neither copied to the imaginary corefile 415 nor listed in the memory range descriptors 430 of the corefile header 420. Although device mapped memory may contain data important for debugging purposes, it is typically not accessible without causing undesired side effects to the devices themselves (due to the mechanism of mapping device controls as memory locations). Further, a device often has strict alignment restrictions so the memory space for the device is typically sparse and requires numerous MRDs to accurately describe the memory space.

Often, however, a filer memory segment contains some data important for debugging purposes as well as data not important for debugging. A conventional corefile routine may rewrite the unimportant data in the segment as all 0s and copy the important data and the rewritten unimportant data to the corefile. The unimportant data rewritten as all 0s can then be compressed at a high ratio to further reduce the size of the corefile. For example, a data buffer typically contains a small amount of metadata (e.g., often as low as a few percent of the data buffer size) that describes the file directory structure of the data buffer which is important for debugging purposes. The remaining portion of the data buffer typically contains user data (e.g., application data) that is not important for debugging purposes. As such, a conventional corefile routine may copy the file directory structure metadata to the corefile as is (bit for bit) but copy the user data in the buffer to the corefile as all 0s. Note that a filer memory segment containing some data important to debugging and other data not important to debugging that have been rewritten as 0s is still listed in the memory range descriptors of the corefile header (i.e., has an associated memory range descriptor in the corefile header).

C. Simulated Corefile Based on Imaginary Corefile

The memory virtualization component 505 of the servicing daemon 392 creates a simulated corefile that represents a filer memory based on an imaginary corefile for the filer memory (i.e., the corefile that would be created to represent the filer memory by a conventional corefile routine had it been invoked to do so). In general, the memory virtualization component 505 creates a simulated corefile comprising a simulated corefile header and no copied filer memory data. The simulated corefile header comprises metadata and memory range descriptors based on the imaginary corefile for the filer memory.

As such, the corefile metadata for the simulated corefile header includes metadata that describes the imaginary corefile (rather than the simulated corefile). For example, the size of the imaginary corefile would be identified in the corefile metadata for the simulated corefile, rather than the size of the simulated corefile (where the size of the imaginary corefile would be much larger than the size of the simulated corefile as the simulated corefile does not contain copied filer memory data). The memory range descriptors in the simulated corefile header would also relate to the imaginary corefile, where each memory range descriptor for a filer memory segment comprises a filer memory address range and a corefile address range where the copied data of the filer memory segment would be located in the imaginary corefile 415. As such, the simulated corefile header contains the same information as the corefile header of the imaginary corefile header. By basing the simulated corefile header on an imaginary corefile that would be produced by a conventional corefile routine, a simulated corefile header is provided that complies with the Core Daemon Protocol and is recognizable and operable by the debugger.

Figure 7:
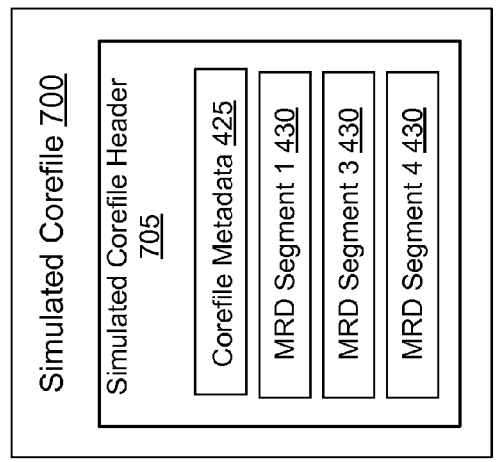
FIG. 7 shows an example of a simulated corefile created for the filer memory of FIG. 4.

FIG. 7 shows an example of a simulated corefile 700 created for the filer memory 400 using the imaginary corefile 415 of FIG. 4. The simulated corefile 700 comprises a simulated corefile header 705 and does not include copied filer memory data. As the information in the simulated corefile header 705 is based on the imaginary corefile 415, the corefile metadata 425 and memory range descriptors 430 of the simulated corefile header 705 will contain the same information as the corefile metadata 425 and memory range descriptors 430 of the imaginary corefile header 420.

After creating the simulated corefile, the memory virtualization component 505 stores the simulated corefile to a predetermined path/location on the filer (e.g., the filer memory's root directory) with a predetermined filename, as conventionally done. The debugger/programmer will have knowledge of the predetermined path/location and predetermined filename so the debugger/programmer can locate and access the simulated corefile.

D. Debugging Session

Referring back to FIG. 5, the memory virtualization component 505 creates the simulated corefile prior to or upon initiation of a debugging session with the debugger 115. The debugging session itself is initiated by a programmer 550 interacting with the debugger 115. In general, a programmer 550 interacts with the debugger 115 to make particular requests (such as a request for a connection with the filer, a request for particular data from the filer, etc.). In other embodiments, the programmer 550 interacts with the debugger 115 to perform other tasks that use debugger routines as an intermediary and are implemented in conjunction with other various tools and automations, such as "peeking" into a corefile, validating corefile uploads, automatically open case records, etc.

An upper level of the debugger 115 receives the requests from the programmer 550 and sends the requests to a lower level of the debugger 115. The lower level of the debugger 115 interacts with the servicing daemon 392 residing at the filer to perform the requests (e.g., establish a connection, retrieve particular data, etc.). After receiving requested data, the lower level sends the data to the upper level of the debugger 115 which presents the data to the programmer (e.g., via a display monitor or printing device). The programmer 550 uses the presented data to develop software programming modifications or additions to the operating system or other applications of the filer.

The debugger 115 includes an interactive component 530 that comprises the upper level of the debugger 115 and an address mapping component 535 and a remote file access component 540 that comprises the lower level of the debugger 115. In other embodiments, the debugger 115 comprises a different number of software components/layers and/or different software components/layers.

The programmer interacts with the interactive component 530 (e.g., through a graphical user or command line interface) to submit various requests, such as connecting with the filer, opening a corefile stored at the filer, reading particular data from the corefile, and closing the corefile and debugging session. The interactive component 530 receives and sends the requests to the lower level of the debugger 115 which interacts with the servicing daemon 392 to perform the requests.

To establish the debugging session, the remote file access component 540 is used to send an initial connection request (e.g., TCP/IP connection) to the servicing daemon 392 residing on the filer. The initial connection request contains an IP address argument that specifies the primary IP address of the filer. The listener component 520 of the servicing daemon 392 actively listens for data packets in the CDP format from the debugger 115 on a dedicated port of the filer. Upon receiving an initial CDP data packet (the connection request), the listener component 520 establishes a connection and private debugging session with the debugger 115. Information regarding the debugging session may then be logged to a session list (e.g., start date and time, etc.). The listener component 520 would then initialize (if not already initialized) the memory virtualization component 505 of the servicing daemon (i.e., cause the memory virtualization component 505 to create and store the simulated corefile to the filer memory). The listener component 520 then hands the debugging session to the RPC component 515 of the servicing daemon 392. The RPC component then receives and validates requests from the debugger 115 thereafter and makes system function calls appropriate for a received request to perform the request.

After the debugging session is established, the remote file access component 540 of the debugger 115 is used to send an Open File request having a path and corefile name arguments (e.g., Open("specified path/corefile name")) to the RPC component 515. The RPC component 515 receives the request and makes an Open file system call to open the corefile having the specified name at the specified path. The specified path and the specified name will correspond to a predetermined path/location on the filer (e.g., the filer memory's root directory) and a predetermined filename for the simulated corefile (so the debugger/programmer can locate and access the simulated corefile). In some embodiments, the simulated corefile is stored using a first predetermined filename and a first predetermined path location on the filer that is specific for simulated corefiles, where a second predetermined filename and a second predetermined path location on the filer is used specifically for real corefiles. As such, when receiving an Open File request for a real corefile (having the second predetermined filename and the second predetermined path), the servicing daemon may, in addition to accessing simulated corefiles, access real corefiles in a conventional manner.

The remote file access component 540 of the debugger 115 is then used to send Read requests for particular data from the corefile. Each Read request will specify a length of data (L) to be read starting at a particular corefile address T. Note that the Read request from the debugger 115 will specify a corefile address and not a filer memory address. This is because in a conventional debugging session, the debugger 115 analyzes data of an actual/real corefile, and thus submits Read requests specifying data at particular corefile addresses. The embodiments of the servicing daemon 392 described herein also receive and respond to Read requests that specify corefile addresses (using a reverse-mapping method described below). As such, modification of the debugger 115 is not necessary to work in conjunction with the servicing daemon 392.

The remote file access component 540 sends Read requests to the RPC component 515 of the servicing daemon 392. When the RPC component 515 receives a Read request, it implements a Read system function call. In some embodiments, a Read system function call is performed by the reverse-address mapping component 510 of the servicing daemon 392. As such, the RPC component 515 sends received Read requests to the reverse-address mapping component 510 for processing.

The first Read request sent by the remote file access component 540 will typically be for the corefile header. The length and corefile address/offset of a Read request for a corefile header will be dependent on the corefile format type. For example, for most corefile format types, a Read request specifying a data length of 4 KB at corefile address 0 indicates a Read request for the corefile header. Upon receiving a Read request (via the RPC component 515), the reverse-address mapping component 510 of the servicing daemon 392 determines if the Read request is a Read request for the corefile header by comparing the requested data length L and corefile address T with the data length and corefile address that specifies a corefile header for the particular corefile format type. If the data lengths and corefile addresses match, the Read request is for the corefile header. If so, the reverse-address mapping component 510 retrieves the simulated corefile header from the simulated corefile and sends the simulated corefile header to the RPC component 515, which in turn relays the simulated corefile header to the remote file access component 540.

Upon receiving the simulated corefile header, the remote file access component 540 sends the simulated corefile header to the address mapping component 535 which reads and interprets the simulated corefile header. Note that the simulated corefile header is based on an imaginary corefile for the filer memory, so that the corefile metadata of the simulated corefile header will be describing the imaginary corefile (including the size of the imaginary corefile) rather than the simulated corefile. As such, the address mapping component 535 will interpret the corefile metadata of the simulated corefile header and determine that the corefile being analyzed has the size of the imaginary corefile.

The simulated corefile header also includes a set of memory range descriptors providing an address mapping table between filer memory addresses and imaginary corefile addresses (dummy addresses). Conventionally, the programmer 550 submits Read requests (through the interactive component 530) specifying data lengths at particular filer memory addresses as the programmer 550 does not have knowledge of the corefile addresses of particular data. The set of memory range descriptors are used by the address mapping component 535 to map a corefile address corresponding to the filer memory address requested by the programmer 550. In the embodiments described herein, the set of memory range descriptors are used by the address mapping component 535 to map a dummy corefile address corresponding to the filer memory address requested by the programmer 550. Note however, the requested data length with remain the same and does not require mapping.

For example, the address mapping component 535 may receive a Read request for data length L starting at filer memory address M. The address mapping component 535 may iterate through each memory range descriptor in the simulated corefile header until it finds a memory range descriptor having a matching filer memory address range containing filer memory address M. If the matching filer memory address range has starting filer memory address R and a corresponding dummy corefile address range having a dummy starting corefile address S, the dummy corefile address T that corresponds to the requested filer memory address M can be calculated from the following equation:

$$\text{dummy corefile address } T = (\text{filer memory address } M - \text{starting filer memory address } R) + \text{dummy starting corefile address } S.$$

After determining the dummy corefile address corresponding to the filer memory address requested by the programmer, the address mapping component 535 sends a Read request specifying data length L (the same data length requested by the programmer) at the dummy corefile address to the remote file access component 540. The remote file access component 540 sends the Read request to the RPC component 515 of the servicing daemon 392 which sends the request to the reverse-address mapping component 510.

The reverse-address mapping component 510 determines if the Read request is a Read request for the corefile header (as discussed above). If not, the reverse-address mapping component 510 performs reverse address mapping of the Read request. Recall that the Read request specifies a data length starting at a dummy corefile address. The reverse-address mapping component 510 re-maps the dummy corefile address to a filer memory address (equal to the filer memory address requested by the programmer) using the simulated corefile header. Note however, the data length with remain the same and does not require re-mapping.

For example, the reverse-address mapping component 510 may receive a Read request for data of length L starting at dummy corefile address T. The reverse-address mapping component 510 may iterate through each memory range descriptor in the simulated corefile header until it finds a memory range descriptor having a matching dummy corefile address range containing dummy corefile address T. If the matching dummy corefile address range has dummy starting corefile address S and a corresponding filer memory address range having a starting filer memory address R, the filer memory address M that corresponds to the requested dummy corefile address T can be calculated from the following equation:

$$\text{filer memory address } M = (\text{dummy corefile address } T - \text{dummy starting corefile address } S) + \text{starting filer memory address } R.$$

The reverse-address mapping component 510 then reads and retrieves data directly from the filer memory starting at the determined filer memory address for the requested length (e.g., data length L starting at filer memory address M). Note that since a real corefile is not actually created, a Read operation on a file using a corefile address is not performed, as conventionally done. Rather, a dummy corefile address is reverse-mapped to determine the filer memory address of the Read request and a Read operation is performed directly on the filer memory rather than on a corefile.

The reverse-address mapping component 510 sends the retrieved data to the RPC component 515. The RPC component 515 relays the retrieved data to the remote file access component 540 which relays it to the interactive component 530 of the debugger 115 for presentation to the programmer. Note that the retrieved data comprises the data desired by the programmer, as the same data length and filer memory address requested by the programmer will be determined by the reverse-address mapping component 510.

To end the debugging session, the remote file access component 540 of the debugger 115 is used to send a Close File command/request (having no arguments) to the RPC component 515 of the servicing daemon 392. The RPC component 515 then makes a Close file system call to close the simulated corefile and the current debugging session. It may further store log information regarding the debugging session to a session list (e.g., end time, etc.), remove the connection from a list of open connections on the session list, and close the network connection.

As described in the embodiments above, a simulated corefile is created comprising a simulated corefile header based on an imaginary corefile (a corefile that would be produced by a traditional corefile routine). The simulated corefile contains no copied filer memory data so that data is read directly from filer memory instead. Creating a simulated corefile and performing data reads from filer memory is less disruptive than creating an actual corefile having large amounts of data copied from filer memory. Also, the use of the various components of the servicing daemon 392 provides (from the debugger's point of view), a traditional corefile debugging session and complies with the Core Daemon Protocol. In other words, from the debugger's point of view it appears that a real corefile has been created and data is being read and retrieved from the corefile. As such, modification of the debugger nor the Core Daemon Protocol is necessary.

Note that the servicing daemon 392 provides a debugging session that provides static and dynamic elements. On the one hand, the simulated corefile header is a static virtualization of the filer memory at the moment the simulated corefile is made. Typically the information in the simulated corefile header does not change until a next reboot of the filer (when the information may change, e.g., due to a card or memory component that has been added or removed from the filer since the last reboot, etc.). As such, the same simulated corefile and simulated corefile header can typically be used for all debugging sessions until the next reboot of the filer. In some embodiments, the servicing daemon is configured such that a new simulated corefile is created at each reboot of the filer. In some embodiments, a simulated corefile is created at each debugging session. On the other hand, the debugging session is dynamic in that requested data is retrieved directly from filer memory which can change during the debugging session to provide the most current up-to-date filer memory data.

IV. Method for Performing Live Debugging of a Filer

Described below are processes of various components/layers of a servicing daemon 392 as performed during a debugging session with a debugger 115 to provide live servicing of an application (e.g., operating system) executing on a running filer 200. As discussed above, a programmer 550 interacts with the upper level of the debugger to submit various requests, such as a connection with the filer, opening of a corefile, and requests for particular data. The upper level of the debugger sends the requests to a lower level of the debugger which interacts with the servicing daemon 392 to execute the requests. The lower level sends any retrieved data to the upper level of the debugger which presents the data to the programmer.

Figure 8:
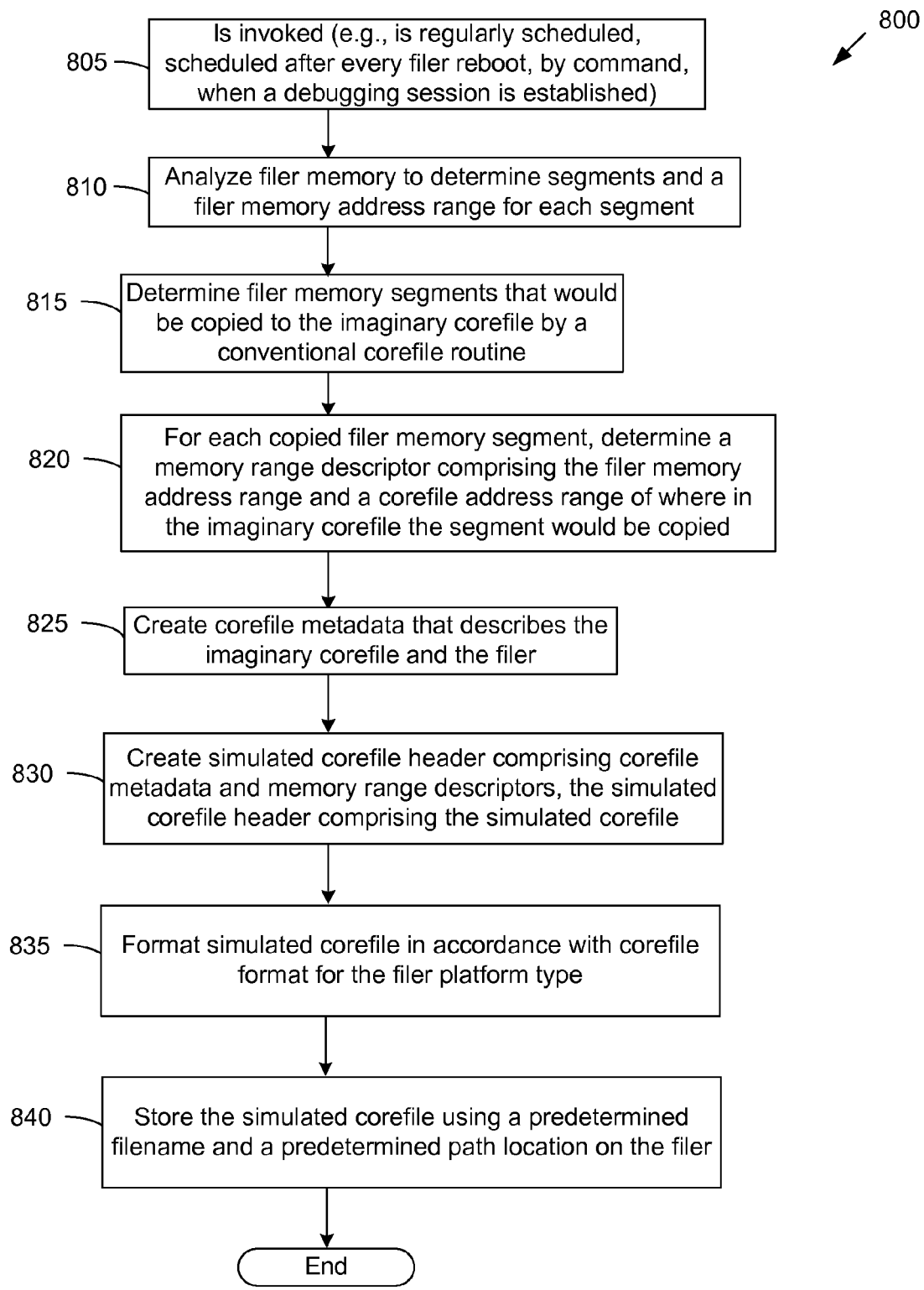
FIG. 8 is a flowchart of a method for creating a simulated corefile.

Prior to or upon initiation of the debugging session with the debugger, the servicing daemon 392 creates a simulated corefile 700 that is a virtualization of the filer memory 400. FIG. 8 is a flowchart of a method 800 for creating the simulated corefile. In some embodiments, the method 800 is implemented by software or hardware configured to create the simulated corefile. In some embodiments, the steps of method 800 are performed by the memory virtualization component 505 of the servicing daemon 392. The order and number of steps of the method 800 are for illustrative purposes only and, in other embodiments, a different order and/or number of steps are used.

The method 800 is invoked (at 805) to create a simulated corefile that is a virtualization of the filer memory. The method 800 may be invoked through a variety of ways. For example, the method may be regularly scheduled to create the simulated corefile, scheduled to create the simulated corefile after every reboot of the filer, or invoked to create the simulated corefile by command from a user or administrator of the filer (e.g., through a command line interface (CLI), a menu, or other selection in a graphical user interface (GUI)). In some embodiments, the method is invoked by the listener component of the servicing daemon to create the simulated corefile when a debugging session is established between the servicing daemon and the debugger.

After being invoked, the method 800 creates (at steps 810 through 835) a simulated corefile based on an imaginary corefile that would have been created by a conventional corefile routine to represent the filer memory, had the conventional corefile routine been invoked to do so. The simulated corefile contains the same information as a corefile header of the imaginary corefile would contain, but does not contain any copied filer memory data.

At step 810, the method 800 analyzes the filer memory (physical address space of the filer) to determine memory segments (related contiguous memory areas) and a filer memory address range for each memory segment. The method 800 then determines (at 815) which filer memory segments would be copied to the imaginary corefile by the conventional corefile routine (e.g., by determining which segments include data that is accessible and important for debugging purposes). For each such copied filer memory segment, the method determines (at 820) a memory range descriptor 430 comprising the filer memory address range of the segment and a dummy corefile address range indicating the location in the imaginary corefile the segment would be copied by the conventional corefile routine. The dummy corefile address ranges of the memory segments may also be determined by adding the size of each successive memory segment to the size of the simulated corefile header (as specified by the corefile format type). An example of such is shown in FIG. 4 where the dummy corefile address range of the first copied segment (Segment 1 Copied Data) is determined by adding the size of the first copied segment to the size of the corefile header (X), and so on for each copied segment.

The method then creates (at 825) corefile metadata 425 that describes the imaginary corefile and the filer, e.g., identification of the imaginary corefile as a corefile type, size of the imaginary corefile as it would be if created, the platform type and model of the filer, the size of the filer memory that is represented, etc.). A simulated corefile header 705 is then created (at 830) comprising the corefile metadata 425 and one or more memory range descriptors 430. The simulated corefile header 705 comprises the simulated corefile 700. The simulated corefile 700 is then formatted (835) in accordance with a particular corefile format type (depending on the platform type of the filer). For example, the simulated corefile header 705 may be formatted so that it is 4 KB in length at corefile address/offset 0. The method then stores (at 840) the simulated corefile using a predetermined filename and a predetermined path location on the filer. In some embodiments, the method 800 stores (at 840) a simulated corefile using a first predetermined filename and a first predetermined path location on the filer that is specific for simulated corefiles, where a second predetermined filename and a second predetermined path location on the filer is used specifically for real corefiles. As such, when receiving a request for a real corefile (having the second predetermined filename and the second predetermined path), the servicing daemon may, in addition to accessing simulated corefiles, access real corefiles in a conventional manner. The method 800 then ends.

Figure 9:
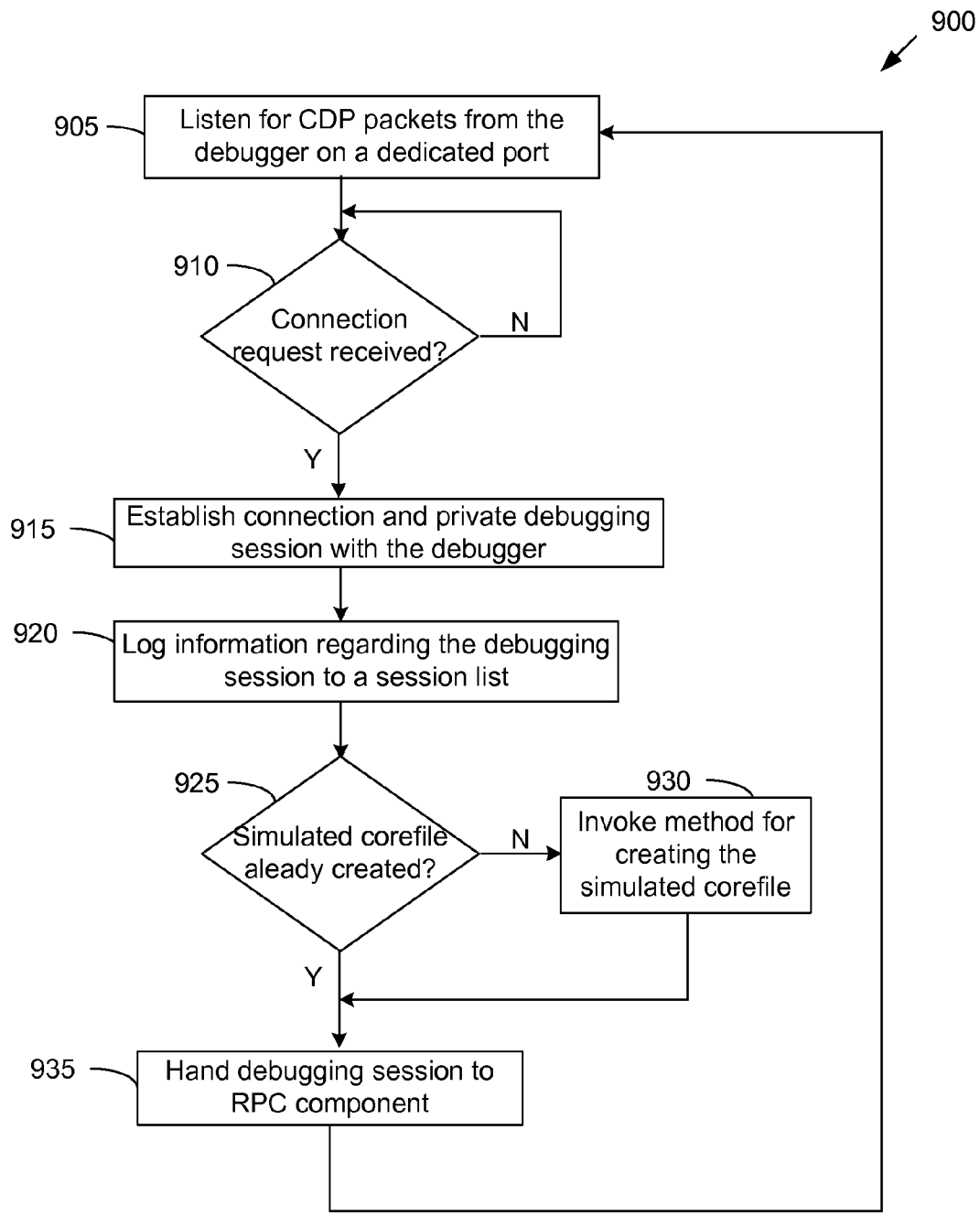
FIG. 9 is a flowchart of a method for establishing a debugging session with a debugger across a network.

FIG. 9 is a flowchart of a method 900 for establishing the debugging session with the debugger across a network. In some embodiments, the method 900 is implemented by software or hardware configured to establish the debugging session. In some embodiments, the steps of method 900 are performed by the listener component 520 of the servicing daemon 392. The order and number of steps of the method 900 are for illustrative purposes only and, in other embodiments, a different order and/or number of steps are used.

The method waits and listens (at 905) for data packets in the CDP format from the debugger on a dedicated port of the filer. The method then determines (at 910) whether an initial CDP data packet (connection request) has been received. If not, the method continues to wait and listen for CDP data packets on the dedicated port (at 905). If so, the method 900 establishes (at 915) a connection and private debugging session with the debugger 115 and logs (at 920) information regarding the debugging session to a session list (e.g., start date and time, etc.).

The method then determines (at 925) whether a simulated corefile representing the filer memory has already been created. If so, the method continues at step 935. If not, the method invokes (at 930) the method for creating the simulated corefile (method 800 of FIG. 8) and continues at step 935. At step 935, the method 900 then hands the debugging session to the RPC component 515 of the servicing daemon 392 which receives and responds to requests from the debugger 115 thereafter (discussed in relation to FIG. 10 below). The method 900 then returns to listening (at 905) on the dedicated port for CDP data packets from the debugger.

Figure 10:
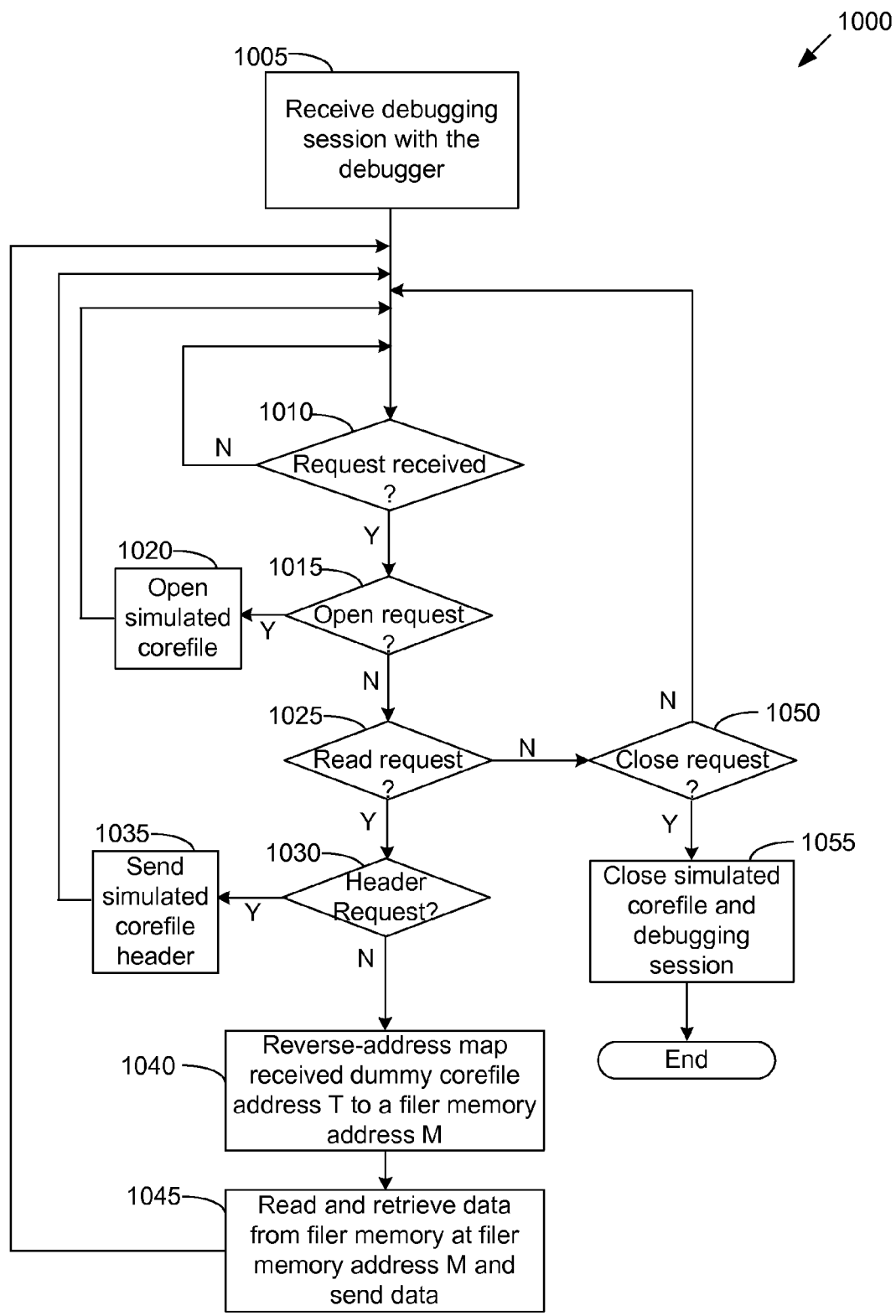
FIG. 10 is a flowchart of a method for responding to requests from a debugger during a debugging session.

FIG. 10 is a flowchart of a method 1000 for responding to requests from a debugger during a debugging session with a debugger across a network. In some embodiments, the method 1000 is implemented by software or hardware configured to respond to request during the debugging session. In some embodiments, the steps of method 1000 are performed by the RPC and reverse-address mapping components 515 and 510 of the servicing daemon 392. The order and number of steps of the method 1000 are for illustrative purposes only and, in other embodiments, a different order and/or number of steps are used.

The method begins when it receives (at 1005) a debugging session with the debugger (established by the listener component 520 of the servicing daemon 392). The method determines (at 1010) whether a request has been received from the debugger. If not, the method continues at step 1010. If so, the method determines (at 1015) if an Open File request (having a path and corefile name arguments) was received. If so, the method performs (at 1020) an Open file system call to open the corefile having the specified name at the specified path. The specified path and the specified name will correspond to a predetermined path on the filer and a predetermined filename for the simulated corefile. As such, the method performs (at 1020) an Open file system call to open the simulated corefile. In some embodiments, the simulated corefile has a first predetermined filename and a first predetermined path location on the filer that is specific for simulated corefiles, where a second predetermined filename and a second predetermined path location on the filer is used specifically for real corefiles. In some embodiments, the method 800 may receive an Open File request specifying a real corefile having the second predetermined filename and the second predetermined path. If so, the servicing daemon may process real corefiles in a conventional manner. The method then continues at step 1010.

If an Open File request was not received (at 1015—No), the method determines (at 1025) if a Read request (specifying a data length L to be read starting at a dummy corefile address T) was received. If so, the method determines (at 1030) if the Read request is for a corefile header (e.g., by comparing the requested length L and dummy corefile address T to a length and corefile address that indicates a corefile header as specified by the corefile format type). If so, the method retrieves and sends (at 1035) to the debugger the simulated corefile header from the simulated corefile.

If the Read request was not for a corefile header (at 1030—No), a Read request for filer memory data copied to a corefile has been received, the Read request containing a data length L and a dummy corefile address T. As such, the method reverse-address maps (at 1040) the received dummy corefile address T to a filer memory address M. The method may do so using a set of memory range descriptors in the simulated corefile header that provides a mapping between filer memory addresses and dummy corefile addresses. The method then reads and retrieves (at 1045) the specified length L of data at filer memory address M directly from the filer memory. The retrieved data is then sent (at 1045) to the debugger. The method then continues at step 1010.

If the request was not for a Read request (at 1025—No), the method 1000 determines (at 1050) if a Close File request was received. If not, the method continues at step 1010. If so, the method performs (at 1055) a Close file system call to close the simulated corefile, the current debugging session, and the network connection. The method 1000 then ends.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A system for providing a debugging session for servicing an application executing on a local computer, the system comprising:
   the local computer comprising:
      a local memory comprising a plurality of memory segments configured for storing data, each memory segment comprising a memory location range; and
      a servicing component configured for providing the debugging session with a remote computer by:
         determining at least one memory segment comprising data relevant for the debugging session and at least one memory segment comprising data not relevant for the debugging session;
         producing a corefile comprising a mapping table that maps between memory locations and dummy locations, the mapping table comprising at least one memory range descriptor (MRD), each MRD being associated with a memory segment and comprising a memory location range of the associated memory segment and a corresponding dummy location range, the mapping table comprising an MRD for the at least one memory segment comprising data relevant for the debugging session and not comprising an MRD for the at least one memory segment comprising data not relevant for the debugging session, wherein the corefile does not comprise data copied from the local memory;
         sending the corefile to the remote computer;
         receiving a read request from the remote computer connected with the local computer through a network, the read request comprising a dummy location;
         mapping the dummy location to a memory location using the corefile; and
         in response to the read request comprising the dummy location, retrieving data directly from the local memory at the mapped memory location and sending the data retrieved from the mapped memory location to the remote computer.

2. The system of claim 1, wherein the application executing on the local computer comprises an operating system of the local computer.

3. The system of claim 1, the debugging session complying with a remote access protocol and providing live servicing of the application.

4. The system of claim 1, wherein the debugging session is performed without stopping other operations of the local computer.

5. The system of claim 1, wherein data relevant for the debugging session is used for debugging the application.

6. The system of claim 1, wherein the corefile further comprises corefile metadata that describes the corefile, the corefile metadata comprising a data size of the corefile if data relevant for the debugging session from the local memory is copied to the corefile.

7. A method for providing a debugging session for servicing an application executing on a local computer, the method comprising:
   storing data to a local memory of the local computer, the local memory comprising a plurality of memory segments configured for storing data, each memory segment comprising a memory location range;
   providing the debugging session with a remote computer by:
      determining at least one memory segment comprising data relevant for the debugging session and at least one memory segment comprising data not relevant for the debugging session;
      producing a corefile comprising a mapping table that maps between memory locations and dummy locations, the mapping table comprising at least one memory range descriptor (MRD), each MRD being associated with a memory segment and comprising a memory location range of the associated memory segment and a corresponding dummy location range, the mapping table comprising an MRD for the at least one memory segment comprising data relevant for the debugging session and not comprising an MRD for the at least one memory segment comprising data not relevant for the debugging session, wherein the corefile does not comprise data copied from the local memory;

sending the corefile to the remote computer;
receiving a read request from the remote computer connected with the local computer through a network, the read request comprising a dummy location;
mapping the dummy location to a memory location using the corefile; and
in response to the read request comprising the dummy location, retrieving data directly from the local memory at the mapped memory location and sending the data retrieved from the mapped local memory location to the remote computer.

8. The method of claim 7, wherein the application executing on the local computer comprises an operating system of the local computer.

9. The method of claim 7, the debugging session complying with a remote access protocol and providing live servicing of the application.

10. The method of claim 7, wherein the debugging session is performed without stopping other operations of the local computer.

11. The method of claim 7, wherein data relevant for the debugging session is used for debugging the application.

12. The method of claim 7, wherein the corefile further comprises corefile metadata that describes the corefile, the corefile metadata comprising a data size of the corefile if data relevant for the debugging session from the local memory is copied to the corefile.

13. A non-transitory computer readable medium having instructions stored thereon when executed by a processor, provide a debugging session for servicing an application executing on a local computer, the non-transitory computer readable medium comprising instructions for:
storing data to a local memory of the local computer, the local memory comprising a plurality of memory segments configured for storing data, each memory segment comprising a memory location range;
providing the debugging session with a remote computer by:
determining at least one memory segment comprising data relevant for the debugging session and at least one memory segment comprising data not relevant for the debugging session;
producing a corefile comprising a mapping table that maps between memory locations and dummy locations, the mapping table comprising at least one memory range descriptor (MRD), each MRD being associated with a memory segment and comprising a memory location range of the associated memory segment and a corresponding dummy location range, the mapping table comprising an MRD for the at least one memory segment comprising data relevant for the debugging session and not comprising an MRD for the at least one memory segment comprising data not relevant for the debugging session, wherein the corefile does not comprise data copied from the local memory;
sending the corefile to the remote computer;
receiving a read request from the remote computer connected with the local computer through a network, the read request comprising a dummy location;
mapping the dummy location to a memory location using the corefile; and
in response to the read request comprising the dummy location, retrieving data directly from the local memory at the mapped memory location and sending the data retrieved from the mapped memory location to the remote computer.

14. The non-transitory computer readable medium of claim 13, wherein the application executing on the local computer comprises an operating system of the local computer.

15. The non-transitory computer readable medium of claim 13, the debugging session complying with a remote access protocol and providing live servicing of the application.

16. The non-transitory computer readable medium of claim 13, wherein the debugging session is performed without stopping other operations of the local computer.

17. The non-transitory computer readable medium of claim 13, wherein data relevant for the debugging session is used for debugging the application.

18. The non-transitory computer readable medium of claim 13, wherein the corefile further comprises corefile metadata that describes the corefile, the corefile metadata comprising a data size of the corefile if data relevant for the debugging session from the local memory is copied to the corefile.

* * * * *